United States Patent [19]

Berti

[11] Patent Number: 4,494,058
[45] Date of Patent: Jan. 15, 1985

[54] MOTOR CONTROL FOR DATA DISC ROTATING SYSTEMS

[75] Inventor: Eugenio Berti, San Jose, Calif.

[73] Assignee: Burroughs Corporation, Detroit, Mich.

[21] Appl. No.: 451,669

[22] Filed: Dec. 21, 1982

[30] Foreign Application Priority Data

Dec. 31, 1981 [GB] United Kingdom ............... 8139206

[51] Int. Cl.³ .............................................. H02K 7/102
[52] U.S. Cl. ................................. 318/372; 318/254; 318/380
[58] Field of Search ............... 318/372, 371, 370, 375, 318/379, 380, 138, 254, 254 A, 439, 139, 258, 261, 269, 273

[56] References Cited

U.S. PATENT DOCUMENTS

| Re. 19,547 | 4/1935 | Wright | 318/258 X |
| 1,077,737 | 11/1913 | Murphy et al. | 318/258 X |
| 3,188,545 | 12/1962 | Sheheen | 318/371 X |
| 3,253,203 | 5/1966 | Bardwell | 318/372 X |
| 3,486,097 | 12/1969 | Shekro | 318/371 X |
| 3,916,272 | 10/1975 | Grünleitner et al. | 318/138 |
| 3,959,700 | 5/1976 | Sugiura et al. | 318/138 |

FOREIGN PATENT DOCUMENTS 2020371 11/1971 Fed. Rep. of Germany ...... 318/138

Primary Examiner—J. V. Truhe
Assistant Examiner—Bentsu Ro
Attorney, Agent, or Firm—Mark T. Starr; Edmund M. Chung; Kevin R. Peterson

[57] ABSTRACT

A system for rotating a data storage disc in a disc drive and for rapidly bringing the disc to a halt comprises a brushless motor fed with direct current in its windings by a motor drive circuit which current is also fed to a solenoid to hold a spring loaded solenoid arm from pressing a brake against a shaft to brake the disc, the motor control circuit using the current caused by back emf in the windings of the motor to provide motor braking while passing the current through the solenoid which applies the brake when the motor speed falls below a predetermined limit, the solenoid also being employed as a current smoothing choke.

12 Claims, 2 Drawing Figures

MOTOR CONTROL FOR DATA DISC ROTATING SYSTEMS

BACKGROUND TO THE INVENTION

1. The Field of the Invention

The present invention relates to systems for rotating discs in disc data stores. In particular it relates to such systems employing brushless D.C. motors where it is desired to brake the rotation of the disc or discs.

2. The Prior Art

It is well known to provide an electric motor to rotate one or more discs in a disc data store. The one or more discs have informational data recorded thereon in a plurality of concentric data storage tracks. The tracks are accessed for the recording or recovery of data by the positioning at selectable radii on the disc of a data recording or recovering transducer to interact with selected tracks. The disc or discs is or are generally magnetic in which case the transducer is a magnetic read/write head.

An important class of disc drives involves the use of a magnetic head which flies a few microinches over a thin magnetic film on a rapidly rotating disc supported by a thin layer of air pulled round by the disc in proximity to its surface. Whereas in the past it was the practice to withdraw the head from the surface of the disc before allowing the disc to cease rotating, with the advent of low cost rotary actuators for positioning the head over the disc for use in dust-free enclosures it has become difficult to do so and in the popular Winchester technology the head is actually moved to a parking track where it is allowed to land on the disc when the disc is stopped.

When landing a head on the disc there is always a risk of damaging the disc surface thereby throwing up debris to catch beneath the head and cause data errors on some other track or indeed to adhere to the head and adversely affect its flying characteristics. Debris can also induce wear on other tracks. The risk of damaging the landing zone is minimized if the rotation of the disc is rapidly braked thereby minimizing the time and distance of abrasive contact between head and landing track after the disc speed has dropped far enough to allow the head to cease flying.

It is well known to employ an electric induction motor to rotate the disc. The induction motor tends to be very large for the particular job in order to provide sufficient starting torque and is not very efficient during running thereby causing the generation of unwanted heat requiring to be dissipated. The induction motor provides little motor braking when power is removed and in order to brake the disc in reasonable time it is necessary to provide a separately operable brake. The brake is required to be very large and is therefor undesirable.

As an improvement over the induction motor, it is also known to provide a D.C. commutator motor for rotating the disc. The commutator motors tend to be smaller and more efficient for the same service. When it is desired to stop the disc a large amount of motor braking is available capable of bringing down the speed of the disc to a low enough level in an acceptably short time for a small mechanical brake to bring the disc to a complete halt. Commutator motors however suffer from commutator arcing which induces noise voltages into the data channel of a disc drive so causing data errors and which can contravene R.F.I. standards.

It has therefore become the practise to employ brushless D.C. motors for rotating the disc wherein hall effect switches take the place of the commutator to switch power via power transistors and the like to the windings. The control of brushless D.C. Motors is relatively complicated. The necessity for disc braking imposes a yet further burden.

SUMMARY OF THE INVENTION

It is therefore desirable to provide a simple and automatic method for braking a disc in a disc drive rotated by a brushless D.C. motor.

According to a first aspect, the present invention consists in a disc drive comprising a brushless D.C. motor for rotating the disc and a switch circuit operable to short out the windings of said brushless motor to provide motor braking for the disc.

According to another aspect, the present invention consists in a disc drive according to the first aspect comprising a solenoid operated brake operable to apply mechanical braking to said disc whenever the current in said solenoid falls below a predetermined limit, said solenoid receiving the current to said windings during the operation of said motor and said switch circuit supplying the short circuit current from said windings to said solenoid when it is desired to brake said disc, said solenoid thereby allowing the application of said brake whenever the rotational speed of said motor falls below a predetermined limit.

According to yet another aspect the present invention consists in a disc drive according to the above aspect wherein said solenoid is employable during the operation of said motor as a choke common to all of said windings for the smoothing of current flow therein.

According to yet another aspect the present invention consists in a disc drive according to any features of the above aspects taken singly or in combination.

BRIEF DESCRIPTION OF THE PREFERRED EMBODIMENT

In a preferred embodiment a brushless motor rotates a shaft which is coupled to rotate a disc. A brake shoe preferably is operable to bear upon the shaft to brake the disc. The shoe is preferably at the distal end of a solenoid arm. The solenoid arm is preferably spring loaded to push the brake shoe against the shaft. A solenoid preferably pulls the solenoid arm away from the shaft thereby disengaging the shoe therefrom. The solenoid arm is preferably spring loaded such that the shoe engages the shaft if the current in the solenoid falls below a predetermined limit. A motor drive circuit preferably provides electrical current for driving the windings of the motor and for the solenoid.

The motor preferably comprises a plurality of windings. The drive circuit preferably comprises a corresponding plurality of selectably operable transistor switches for supplying current to the windings in response to a corresponding plurality of externally received winding energization commands. There are preferably three windings. One end of each winding is preferably coupled to the collector of its individual transistor switch. The other end of each winding is preferably connected to a common point. The common point is preferably connected to a first end of the winding of the solenoid. The second end of the winding of the solenoid is preferably connected via a first ganged switch to a power supply rail. Each collector of each transistor switch is preferably coupled via a diode to a common energy absorbing circuit coupled intermediately between the diodes and the common point between the second end of the winding of the solenoid and the first ganged switch. A second ganged switch is preferably connected across said energy absorbing circuit. The energy absorbing circuit preferably comprises a resistor. The energy absorbing circuit also preferably comprises a capacitor. The energy absorbing circuit is preferably operable to receive recoil energy from the windings when the current in each one thereof is cut off by its associated transistor switch.

The first and second ganged switches are preferably ganged together such that the first switch is open when the other is closed and vice versa.

During the operation of the motor the current in the windings preferably flows through the solenoid, the first switch being open and the second closed, so maintaining the brake shoe clear of the shaft by maintaining the current in the solenoid above the predetermined level, allowing the inductance of the solenoid to smooth the current through the windings, and permitting the energy absorbing circuit to absorb the energy transients from the windings.

The braking of the motor is preferably initiated by the operation of the ganged switches such that the first ganged switch is opened, thereby disconnecting the supply rail and the second ganged switch is closed, thereby shorting out the energy absorbing circuit and allowing the back emf of the windings to drive short circuit current through the diodes and through the winding of the solenoid to provide motor braking, the solenoid releasing the solenoid arm when the current in its winding falls below the predetermined level indicatively of the rotation of the motor having fallen below a predetermined speed and the released solenoid arm applying the brake shoe to the shaft to bring the motor to a complete halt from the predetermined speed.

The invention is further explained, by way of an example, by the following description taken in conjunction with the appended drawings, in which:

DETAILED DESCRIPTION OF THE PREFERRED EMBODIMENT

Figure 1:
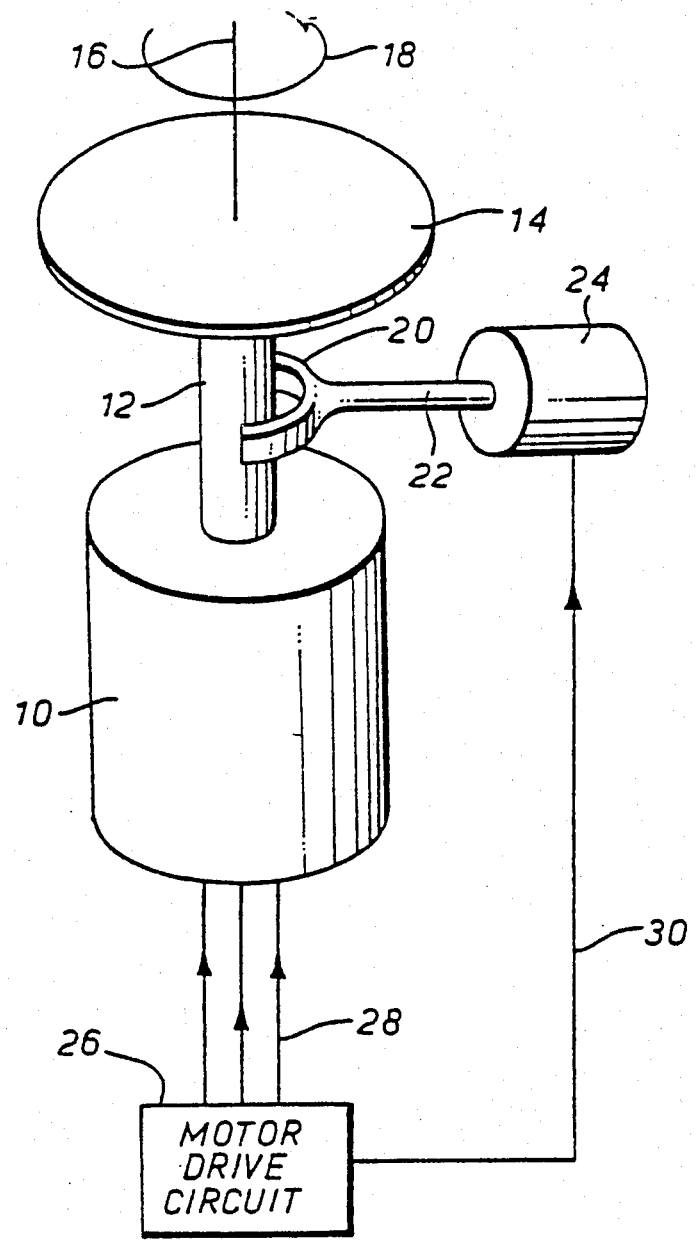
FIG. 1 shows the mechanical arrangement of the elements of the preferred embodiment of the invention.

FIG. 1 shows the mechanical arrangement of the preferred embodiment.

A brushless D.C. Motor 10 provides motive torque to a shaft 12. The shaft 12 is coaxially coupled to a disc 14 which is thereby caused to rotate about its axis 16 as indicated by the arrow 18.

A brake shoe 20, conformal to the surface of the circular shaft 12, is disposed in adjacense thereto on the distal end of a solenoid arm 22. The solenoid arm 22 is spring loaded to push the shoe 20 against the shaft 12. The solenoid arm 22 is subject to the pull of a solenoid 24 whenever a current flows in its coil. Whenever the current in the solenoid 24 exceeds predetermined limit the solenoid pull overcomes the spring loading and pulls the arm 22 away from the shaft 12 to disengage the brake shoe 20 from the surface thereof.

A motor drive circuit 26 provides power for the windings of the motor 10 via a motor coupling 28 and current for the solenoid 24 via a solenoid coupling 30.

It is to be appreciated that whereas only one disc is shown, it can be representative of any number of discs on a common axis. It is further to be appreciated that the motor 10 can drive the disc 14 other than through a shaft 12, as an example, being a pancake motor directly driving a disc 14. The brake shoe and shaft 20, 12 combination can be replaced by any mechanically actuatable device capable of stopping the disc 14.

Figure 2:
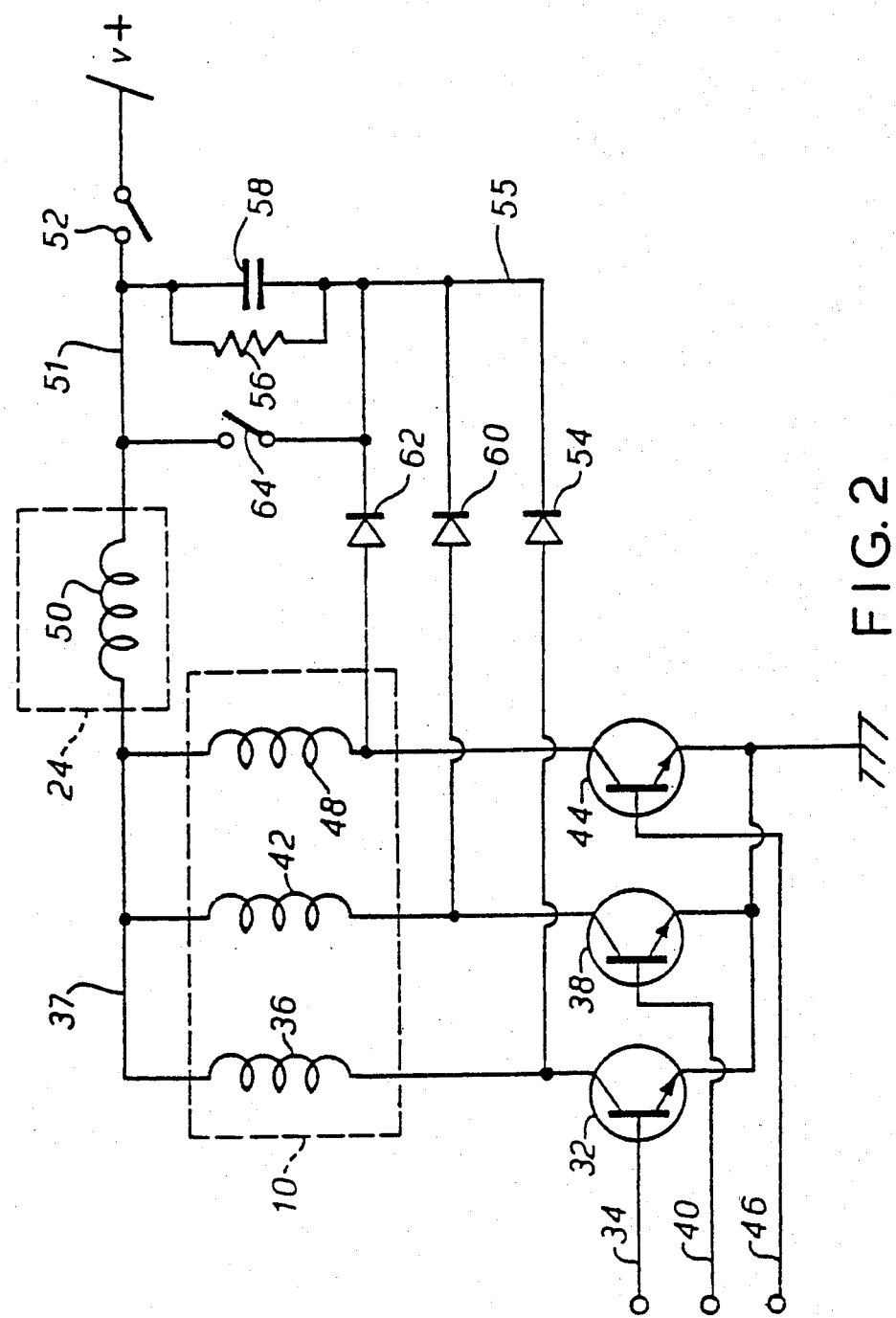
FIG. 2 shows a schematic diagram of the electrical arrangement of the invention.

FIG. 2 shows a schematic diagram of the motor drive circuit 26 coupled to the solenoid 24 and to the motor 10.

A first transistor switch 32 is operable in response to a signal on a first input line 34 to allow the flow of current in a first winding 36 of the motor 10, a first end of which is coupled to its collector and a second end of which is connected to a common point 37. A second transistor switch 38 is operable in response to a signal on a second input line 40 to allow the flow of current in a second winding 42 of the motor 10, a first end of which is connected to the collector of the second transistor switch 38 and the second end of which is connected to the common point 37. A third transistor switch 44 is operable in response to a signal on a third input line 46 to allow the flow of current in a third winding 48 of the motor 10, a first end of which is connected to the collector of the third transistor switch 44 and the other end of which is connected to the common point 37.

The common point 37 is connected to a first end of the winding 50 of the solenoid 24. The other end of the winding 50 of the solenoid 24 is connected to a supply point 51. The supply point 51 is connectable to a positive supply rail V+ via a first ganged switch 52.

A first diode 54 is coupled intermediately between the collector of the first transistor switch 32 and a diode star point 55 such that the first diode 54 conducts when the voltage on the collector of the first transistor switch 32 is more positive than the voltage on the star point 55. The star point 55 is connected via a resistor 56 in parallel with a capacitor 58 to the supply point 51. A second diode 60 is connected between the collector of the second transistor switch 38 and the star point 55 to conduct when the collector of the second transistor switch 38 is more positive. A third diode 62 is connected between the collector of the third transistor switch 44 and the star point 55 to conduct when the collector of the third transistor switch 44 is more positive. A second ganged switch 64 is operable to connect the star point 55 directly to the supply point 51.

The first and second ganged switches 52, 64 are collectively operable such that in a first state the first switch 52 is closed and the second switch 64 is open allowing power to be delivered from the rail V+ via the winding 50 of the solenoid 24 to the windings 36, 42, 48 of the motor 10 and providing the parallel combination of the resistor 56 and the capacitor 58 between the star point 55 and the supply point 51, and in a second state the first switch 52 is open removing all motive power from the motor 10 and the second switch 64 is closed connecting the star point 55 directly to the supply point 51.

During operation of the motor 10 the ganged switches 52, 64 are placed in the first state. The windings 36, 42, 48 of the motor 10 are energized in turn in response to signals on the input lines 34, 40, 46. The exact manner of the provision of the external stimulation does not constitute part of the present invention. It may be provided in response to the outputs of hall effect sensors commanding commutation of the current in the windings 36, 42, 48. Alternatively, the stimulation can come from a fixed frequency source or a variable frequency source stimulating each winding in turn to operate the motor 10 in a synchronous manner. It will be appreciated that the motor can be of any kind wherein there are provided a plurality of separate windings operable when shorted out to provide motor braking. While only three phases are shown for the motor 10, it will be appreciated that by obvious modifications to the embodiment any number of phases can be accommodated.

During operation of the motor 10 the current to the windings 36, 42, 48 flows through the coil 50 of the solenoid 24, exceeding the minimum holding value and thereby preventing the brake shoe 20 from engaging the shaft 12. As the current in the windings 36, 42, 48 is switched off, the energy transient resultant therefrom is coupled by the appropriate diode 54, 60, 62 respectively to be dissipated in the parallel combination of the resistor 56, and the capacitor 58. It is to be appreciated that the parallel combination of the resistor and the capcitor 56, 58 is representative of any suitable energy absorbing device and can include thermistors, voltage dependent resistors and the like.

When it is desired to brake the motor 10 the ganged switches 52, 64 are placed in the second state. The first switch 52, now open, cuts off all power from the rail so that all drive to the motor 10 stops regardlessly of what the signals on the input lines 34, 40, 46 may be doing. The star point 55 is connected directly to the supply point 51. As the motor 10 coasts without power the windings 36, 42, 48 each generate their own back emf by dynamo effect which is coupled via the diodes 54, 60, 62 to maintain a current in the loop comprising the windings 36, 42, 48, the diodes 54, 60, 62, the star point 55 shorted by the second switch 64 to the supply point 51 and the winding 50 of the solenoid. The maintained current flows in the same direction as the original drive currents and provides motor braking to reduce the speed of the disc 14. The magnitude of the maintained current is a function of the residual speed of the disc 14. As the motor braking brings the speed of the disc 14 below a predetermined speed, the current in the coil 50 of the solenoid 24 falls below the predetermined holding value and the solenoid releases the solenoid arm 22 whose spring loading pushes the brake shoe 20 against the shaft 12 to brake the residual rotation of the disc to a halt.

The ganged switches 52, 64 may be variously implemented. They can be contacts on a common relay in which case those skilled in the art will be aware of different ways of energizing the relay to monitor power supplies, to respond to a master on/off switch for the disc drive and the like. Equally the switches 52, 64 can be additional contacts on the on/off master switch for the disc drive. Those skilled in the art will be aware that the first switch 52 can be opened before the second switch 64 is closed, and that as a consequence the operation of the second switch 64 can be made dependent upon the operation of the first switch in a master-slave fashion.

Those skilled in the art will be aware of many other uses for the invention as described outwith the rotation of discs in disc data stores.

What I claim is:

1. An apparatus for rotating an informational data storage disc in a disc data store wherein a motor has a plurality of stator windings, each having a first end coupled to a common point, in turn coupled to a power supply point via a choke and each having a second end selectably couplable to a power supply return through a corresponding plurality of selectably operable stator switches, said apparatus comprising:

energy absorbing circuit means, coupled intermediately between said second ends of said windings and said power supply point, for absorbing inductive recoil energy from said windings; and ganged double switch means, including a first section operable when said double switch means is in a first position for coupling said power supply point to a power supply rail for the operation of said motor and a second section operable when said double switch means is in a second position for shunting said energy absorbing circuit means to thereby pass dynamo currents, generated in said windings in consequence of the rotation of said motor, through said choke to act as a brake upon the rotation of said motor.

2. An apparatus according to claim 1 further including a brake, operable under the action of a spring, to engage said motor and to apply a braking force thereto, and wherein said choke comprises a solenoid for applying a force to said brake in opposition to said spring, where
   when said double switch means is in said first position and said motor is operational, said solenoid causes said brake to disengage from said motor, and
   when said double switch means is in said second position, said dynamo current through said choke retains said brake in disengagement from said motor until the angular velocity of said disc falls below a predetermined value.

3. An apparatus according to claim 2 wherein said energy absorbing circuit means comprises:

a plurality of diodes, each one of said plurality of diodes coupled to the second end of one of said plurality of stator windings, all of said diodes being in turn coupled to a star point, each one of said plurality of diodes being operable to conduct whenever the voltage at the end coupled to the respective second end of said one of said plurality of stator windings exceeds the voltage at said star point; and an energy absorber coupled between said star point and said power supply point.

4. An apparatus according to claim 3 wherein said second section of said double switch means is connected intermediately between said star point and said power supply point to short out said energy absorber whenever said double switch means is in said second position.

5. An apparatus according to claim 4 wherein said energy absorber comprises a resistive element in parallel with a capacitive element.

6. An apparatus according to claims 1 or 2, or 3, or 4, or 5 wherein each of said stator switches comprises a switching transistor selectably operable in response to an external command signal to couple said second end of the associated one of said stator winding to said power supply return.

7. An apparatus according to claim 6 wherein said motor is a hall effect motor and said external command signal is derived from the output of a hall effect sensor for sensing the angular position of the armature of said motor.

8. An apparatus according to claim 1 wherein said energy absorbing circuit means comprises:

a plurality of diodes, each one of said plurality of diodes coupled to the second end of one of said plurality of stator windings, all of said diodes being in turn coupled to a star point, each one of said plurality of diodes being operable to conduct whenever the voltage at the end coupled to the respective second end of said one of said plurality of stator windings exceeds the voltage at said star point; and an energy absorber coupled between said star point and said power supply point.

9. An apparatus according to claim 8 wherein said second section of said double switch means is connected intermediately between said star point and said power supply point to short out said energy absorber whenever said double switch means is in said second position.

10. An apparatus according to claim 9 wherein said energy absorber comprises a resistive element in parallel with a capacitive element.

11. An apparatus according to claims 8, or 9, or 10 wherein each of said stator switches comprises a switching transistor selectably operable in response to an external command signal to couple said second end of said associated one of said stator windings to said power supply return.

12. An apparatus according to claim 11 wherein said motor is a hall effect motor and said external command signal is derived from the output of a hall effect sensor for sensing the angular position of the armature of said motor.

* * * * *